United States Patent [19]
Galbraith et al.

[11] Patent Number: 5,255,132
[45] Date of Patent: Oct. 19, 1993

[54] ADAPTABLE CLOCK CONTROL METHODS AND APPARATUS FOR A DIRECT ACCESS DISK DRIVE SYSTEM

[75] Inventors: Richard L. Galbraith; Daniel D. Reno, both of Rochester, Minn.

[73] Assignee: International Business Machines Corporation, Armonk, N.Y.

[21] Appl. No.: 754,877

[22] Filed: Sep. 4, 1991

[51] Int. Cl.$^5$ ............................................. G11B 5/09
[52] U.S. Cl. ................................ 360/51; 360/32; 360/48
[58] Field of Search .................. 360/51, 78.09, 78.04, 360/59, 48, 32, 75, 70, 53, 46, 72.1, 31, 42, 77.01, 77.07, 135; 369/59

[56] References Cited

U.S. PATENT DOCUMENTS

| | | | |
|---|---|---|---|
| 4,133,011 | 1/1979 | Kurzweil, Jr. | 360/78.09 |
| 4,297,734 | 10/1981 | Laishley et al. | 360/78.09 |
| 4,297,737 | 10/1981 | Andresen et al. | 360/135 |
| 4,488,189 | 12/1984 | Axmear et al. | 360/78.04 |
| 4,575,776 | 3/1986 | Stephens et al. | 36/78.09 |
| 4,675,884 | 6/1987 | Nakamura et al. | 360/42 X |
| 4,748,611 | 5/1988 | Tsuyoshi et al. | 369/59 |
| 4,809,091 | 2/1989 | Miyazawa et al. | 360/48 |
| 4,812,924 | 3/1989 | Fukami et al. | 360/32 |
| 4,819,103 | 4/1989 | Okamura | 360/51 |
| 4,893,199 | 1/1990 | Okada | 360/48 |
| 4,899,232 | 2/1990 | Odaka et al. | 360/48 |
| 4,907,101 | 3/1990 | Keesen et al. | 360/48 |
| 4,908,812 | 3/1990 | Aoshima et al. | 36/51 X |
| 5,012,459 | 4/1991 | Odaka et al. | 360/32 |
| 5,050,013 | 9/1991 | Holsinger | 360/72.1 |
| 5,146,372 | 9/1992 | Cronch et al. | 360/51 |

OTHER PUBLICATIONS

Dawson, H., et al. "Sector Pulse Check Circuit." vol. 19, No. 11, pp. 4349-4351. IBM Technical Disclosure Bulletin. Apr. 1977.

Elliott, P. J., et al. "Soft Sector Disk File System." vol. 30, No. 11, pp. 252-253. IBM Technical Disclosure Bulletin. Apr. 1988.

Elliott, P. J., et al. "Phase Error Detect Logic for Disk File Speed Control." vol. 32, No. 5B, pp. 322-324. IBM Technical Disclosure Bulletin, Oct. 1989.

Conway, J. L., et al. "Digital Encoding Scheme with Error Detction." vol. 32, No. 6A, pp. 27 and 276. IBM Technical Disclosure Bulletin. Nov. 1989.

Primary Examiner—Robert J. Pascal
Assistant Examiner—Ali Neyzari
Attorney, Agent, or Firm—Joan Pennington; Richard E. Billion; Bradley A. Forrest

[57] ABSTRACT

A method and apparatus for modulating a data reference clock for rotational speed variations of the data storage disk in a direct access data storage file. A data reference clock is generated from an encoded disk rate clock of the data file. A readback signal from at least one predetermined region of the disk surface is sensed and a sync byte is detected responsive to the readback signal. An early window control signal and a late window control signal are generated corresponding to end boundaries for capturing readback encoded data signals. A load complete signal is identified responsive to the readback signal. The identified load complete signal with the early window control signal and the late window control signal and the generated data reference clock is adjusted responsive to overlapping compared signals.

10 Claims, 3 Drawing Sheets

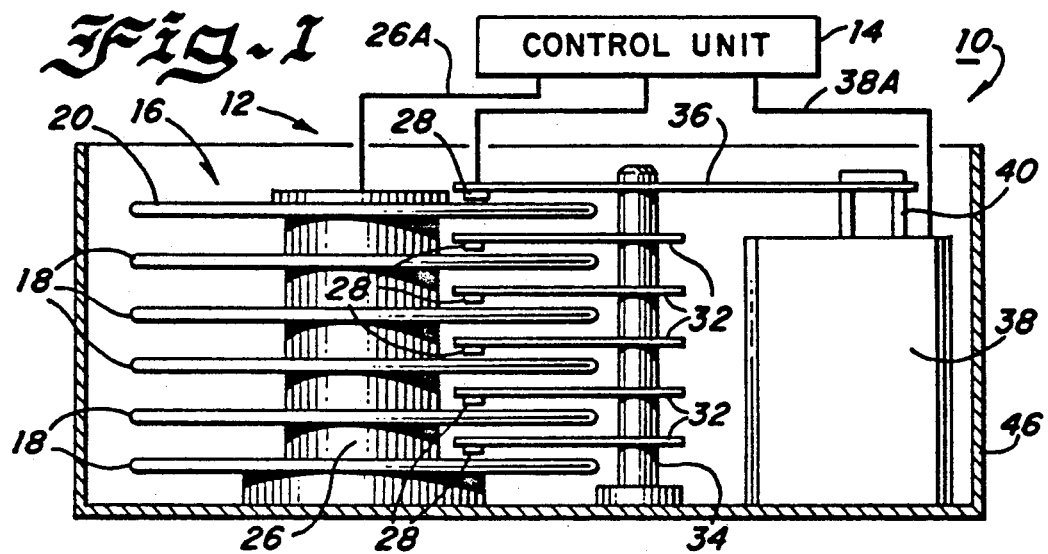
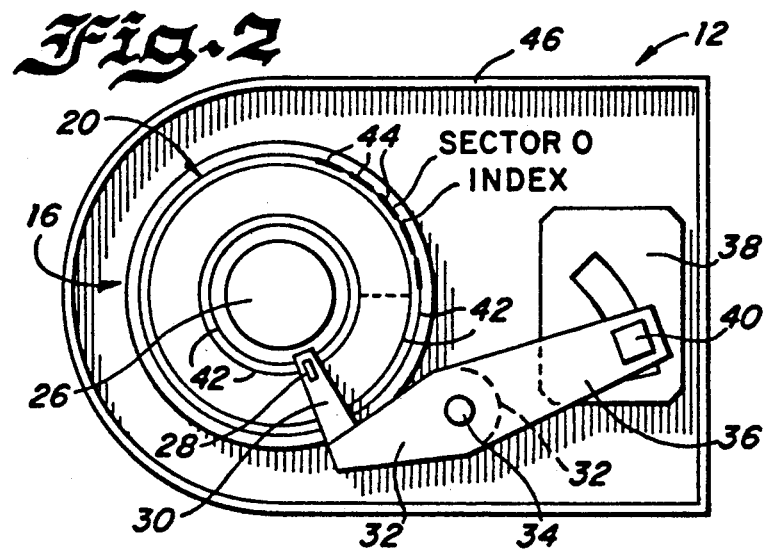

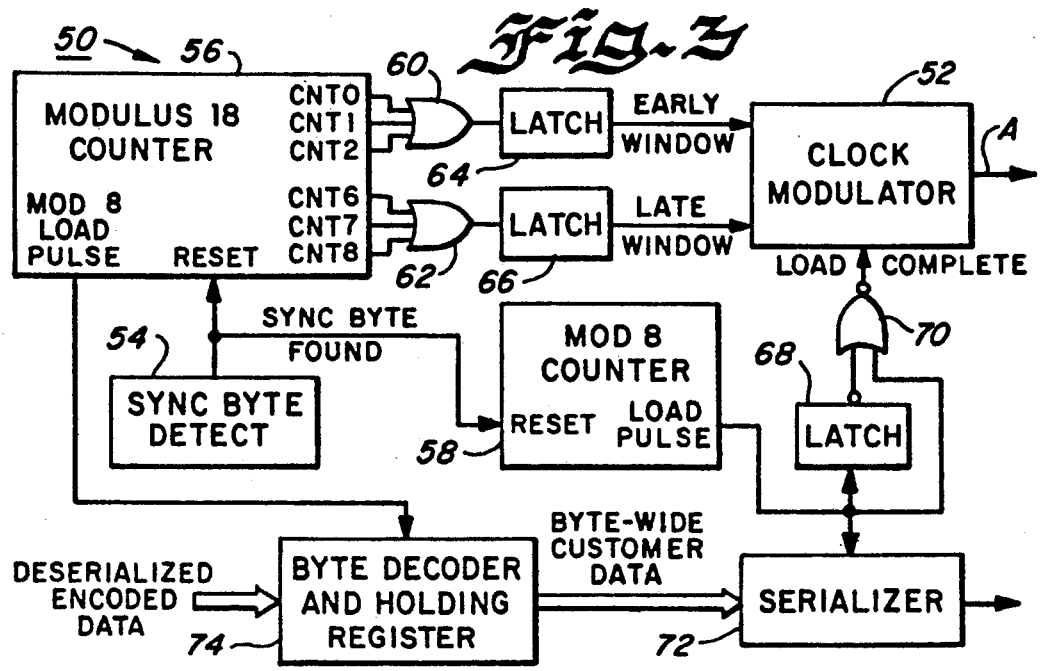
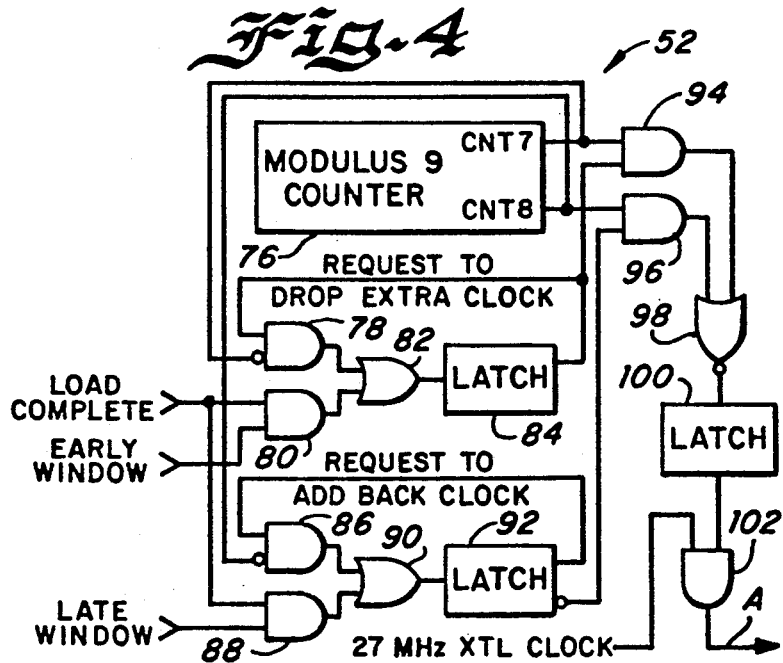

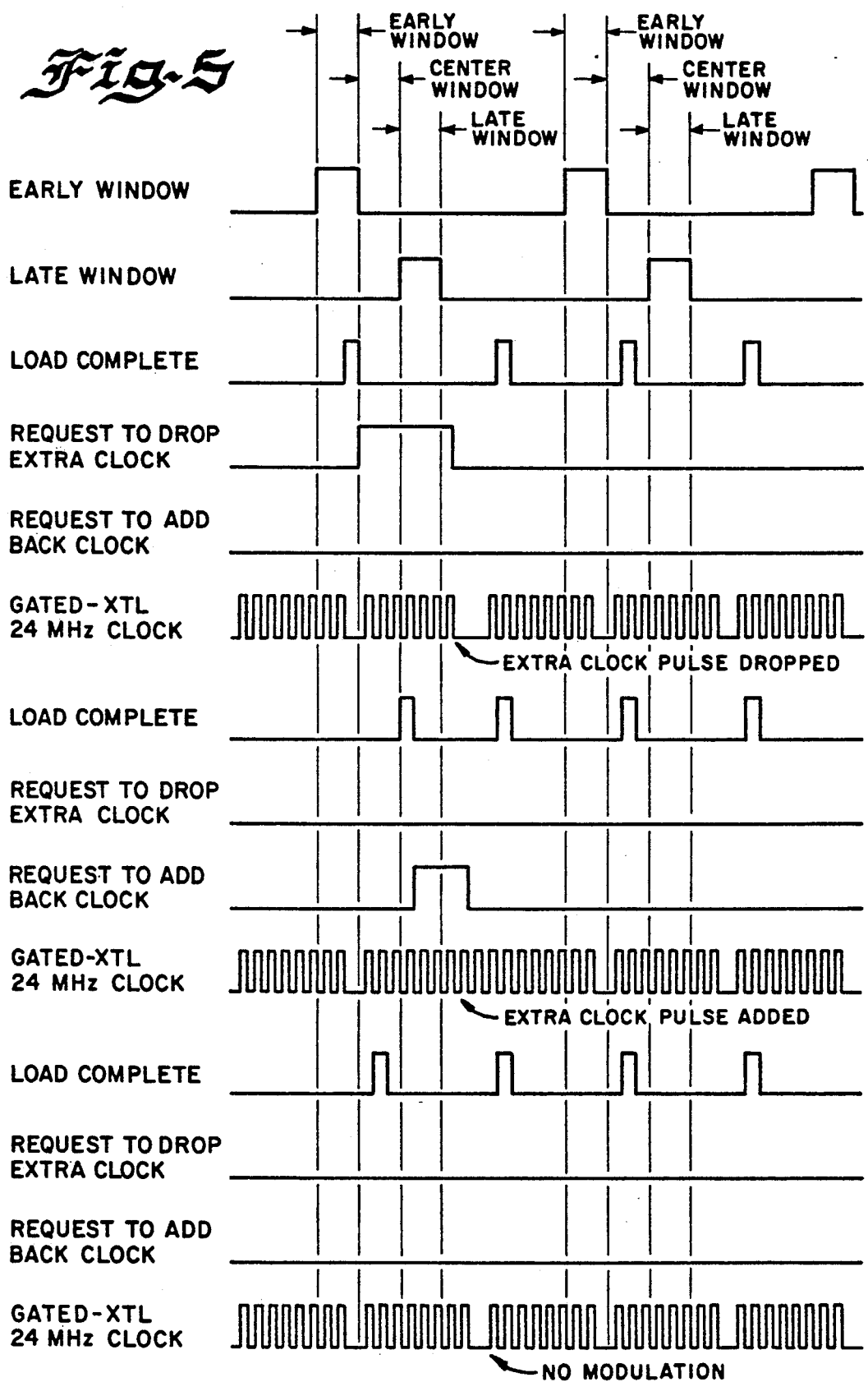

ADAPTABLE CLOCK CONTROL METHODS AND APPARATUS FOR A DIRECT ACCESS DISK DRIVE SYSTEM

BACKGROUND OF THE INVENTION

1. Field of the Invention

The present invention relates generally to a digital clock modulator and more particularly to an adaptable clock control method and apparatus for a direct access storage device (DASD).

2. Description of the Prior Art

Computers often include auxiliary memory storage units having media on which data can be written and from which data can be read for later use. Disk drive units incorporating stacked, commonly rotated rigid magnetic disks are used for storage of data in magnetic form on the disk surfaces. Data is recorded in concentric, radially spaced data information tracks arrayed on the surfaces of the disks. Transducer heads driven in a path toward and away from the drive axis write data to the disks and read data from the disks.

All DASD units must have a method to position each data head over the proper radial location to write a track and again, to position it very close to the same location to read the track. With the higher level files using a voice coil type of actuator, a feedback mechanism must be provided to locate and stably hold the head on a given track. Typically, track accessing and track following is provided utilizing a magnetically written pattern in the DASD unit. A dedicated servo system employs one surface of one of the disks in the DASD on which to have all the tracking and access information. A sector servo system uses small portions of tracks between each or between several sectors on each track of each data surface to provide the tracking and access information. A hybrid servo system uses both to obtain advantages of each type of servo. Examples of known positioning and servo systems are provided by U.S. patents U.S. Pat. Nos. 4,133,011 to Kurzweil, Jr.; 4,297,734 to Laishley et al.; 4,297,737 to Andersen et al.; 4,488,189 to Axmear et al.; and 4,575,776 to Stephens et al.

Achievement of high data density and high data rates has resulted in the use of a partial-response maximum-likelihood (PRML) channel for writing and reading digital data on the disks.

As a result, a problem exists to interface a high speed clock used with the PRML channel with the symmetry and frequency limited conventional disk controller. Both the timing problem of interfacing the chips and the variation allowed by the motor controlling the rotational speed of the disks has required implementation of expensive analog clock generation circuits or changing the architecture of the disk controller chip for supplying the necessary clock structure while keeping synchronized to the RPM of the disk during reads.

SUMMARY OF THE INVENTION

A principal object of the present invention is to provide an adaptable clock control method and apparatus for a disk drive data storage system. Other objects are to provide such an adaptable clock control method and apparatus for a disk drive data storage system substantially without negative effects and that overcome many of the disadvantages of prior art arrangements.

In brief, the objects and advantages of the present invention are achieved by a data clock modulation method and apparatus for a disk drive data storage file. A data reference clock is generated from an encoded disk rate clock of the data file. A readback signal from at least one predetermined region of the disk surface is sensed and a sync byte is detected responsive to the readback signal. An early window control signal and a late window control signal are generated corresponding to end boundaries for capturing readback encoded data signals. A load complete signal is identified responsive to the readback signal. The identified load complete signal is compared with both the early window control signal and the late window control signal and the generated data reference clock is adjusted responsive to overlapping compared signals.

BRIEF DESCRIPTION OF THE DRAWINGS

The present invention together with the above and other objects and advantages may best be understood from the following detailed description of the embodiment of the invention illustrated in the drawings, wherein:

FIG. 1 is a schematic and block diagram of a data storage disk file embodying the present invention;

FIG. 2 is a diagram showing the accessing mechanism for a single disk surface of the apparatus of FIG. 1;

FIGS. 3 and 4 are diagrams illustrating apparatus for carrying out the adaptable clock control method according to the present invention in the data storage disk file of FIG. 1; and FIG. 5 is a chart illustrating clock modulation operation of the apparatus of FIGS. 3 and 4.

DETAILED DESCRIPTION OF THE PREFERRED EMBODIMENTS

In FIG. 1 there is shown a partly schematic block diagram of parts of a data storage disk file 10 including a data storage medium generally designated as 12 and a control unit generally designated as 14. In the preferred embodiment of this invention, the data storage medium 12 is embodied in a rigid magnetic disk drive unit 12, although other mechanically moving memory configurations may be used. Unit 12 is illustrated in simplified form sufficient for an understanding of the present invention because the utility of the present invention is not limited to the details of a particular drive unit construction.

Referring now to FIGS. 1 and 2 of the drawings, disk drive unit 12 includes a stack 16 of disks 18 having at least one magnetic surface 20. The disks 18 are mounted in parallel for simultaneous rotation on and by an integrated spindle and motor assembly 26. Data information on each disk 18 are read and/or written to by a corresponding transducer head 28 movable across the disk surface 20.

Transducer heads 28 are mounted on flexure springs 30 carried by arms 32 ganged together for simultaneous pivotal movement about a support spindle 34. One of the arms 32 includes an extension 36 driven in a pivotal motion by a head drive motor 38. Although several drive arrangements are commonly used, the motor 38 can include a voice coil motor 40 cooperating with a magnet and core assembly (not seen) operatively controlled for moving the transducer heads 28 in synchronism in a radial direction in order to position the heads in registration with data information tracks or data cylinders 42 to be followed and access particular data sectors 44. Data storage disk file 10 is a modular unit including a housing 46. The various components of the disk file 10 are controlled in operation by signals generated by control unit 34 such as motor control signals on line 26A and position control signals on line 38A.

Numerous data information tracks 42 each at a specific radial location are arrayed in a concentric pattern in the magnetic medium of each disk surface 20 of data disks 18. A data cylinder includes a set of corresponding data information tracks 42 for the data surfaces 20 in the data storage disk file 10. Data information tracks 42 include a plurality of segments or data sectors 44 each for containing a predefined size of individual groups of data records which are saved for later retrieval and updates. The data information tracks 42 are disposed at predetermined positions relative to a servo reference index. In FIG. 2 one sector 44 is illustrated as SECTOR 0 with a fixed index or mark INDEX for properly locating the first data sector. The location of each next sector 44 is identified by a sector identification (SID) pulse read by transducer heads 28 from surfaces 20.

Referring to FIG. 3 there is shown a circuit diagram illustrating an adaptable data clock rate circuit generally designated 50. Adaptable data clock rate circuit 50 generates a data read/reference clock indicated at a line labelled A from a singular encoded reference clock source. During write or idle modes, the data read/reference clock is derived by the adaptable data clock rate circuit 50 utilizing the nominal encoded disk rate clock, and dropping out clock pulses according to the encode/decode code rate.

For example, when the PRML channel uses a rate 8/9 encode/decode code and the average customer data rate is specified to be 24 MHz, the encoded disk data rate is specified at 27 MHz. Then a 27 MHz clock is required to drive the write circuitry of the data channel.

During a write, the PRML data channel requires a minimum 45-55 duty cycle clock, whose frequency is equal to that of the encoded disk data rate specified for the file. During a read, the PRML data channel supplies a 45-55 symmetry clock which is also derived from the encoded disk data rate specified for the file; however, this signal differs from the clock used during the write process according to the motor speed tolerance specified for the file. Adaptable data clock rate circuit 50 drops one pulse for every nine clock pulses from the 27 MHz clock to generate a resulting 24 MHz data clock rate from the rate 8/9 clock of 27 MHz.

Disk controller's clock source A during data disk reads is also based on the same 27 MHz clock source as for the non-read modes. Then clock source signal A is modified by either dropping extra clocks or adding back the intended dropped clocks to allow the instantaneous data rate of the customer data to track the current disk data rate according to variations in the rotational disk speed controlled by the motor 26.

Adaptable data clock rate circuit 50 generates a customer read/ref clock from a singular encoded reference clock source. Although a specific clock frequency of a 27 MHz crystal for the encoded reference clock source and an 8/9 code rate are depicted to yield a 24 MHz customer read/ref clock, it should be understood that the present invention is applicable to other frequencies and code rates. The customer read/ref clock is utilized by the disk controller 14 as a reference clock during non-read modes and a read clock during read operations. In a read operation, serialized customer read data is synchronously transferred to the disk controller by use of the customer read/ref clock. It is a requirement for the generated customer read/ref clock to be phase locked to both the encoded read clock during read operations and the encoded reference clock during non-read operations. The encoded reference clock represents the nominal encoded frequency, but is never assumed to be phase or frequency locked to the disk rotation.

As its primary functional block, adaptable data clock rate circuit 50 includes a CLOCK MODULATOR 52 for generating the data read/ref clock A responsive to a plurality of control inputs, for example, LOAD COMPLETE, EARLY WINDOW and LATE WINDOW. FIG. 4 illustrates one possible logical implementation of the CLOCK MODULATOR block 52. Two of the control inputs, EARLY WINDOW and LATE WINDOW signals, generated by logic running from the 27 MHz encoded clock provide end boundaries around an implied CENTER WINDOW. The CENTER WINDOW indicates the desired capture point for decoded data bytes. The LOAD COMPLETE signal pulse applied to the CLOCK MODULATOR 52 is generated by logic running from the 24 MHz customer read/ref clock. The LOAD COMPLETE pulse marks the timing point at which decoded data bytes are captured. The CLOCK MODULATOR 52 nominally gates off one out of nine encoded reference clock pulses in order to derive the customer read/ref clock. Modulation of the customer read/ref clock is accomplished by either gating off an extra clock pulse to decrease the clock frequency or by adding back the missing clock pulse to increase the clock frequency.

A SYNC BYTE DETECT circuit 54 sets the initial byte phasing relationship between encoded read clocked logic and data read/ref clocked logic at the start of a disk read operations. When the sync byte is detected, a first circuit counter 56 and a second circuit counter 58 are initialized such that the LOAD COMPLETE pulse will fall within the CENTER WINDOW boundaries. As shown at a line labelled SYNC BYTE FOUND, the detected sync byte is applied to a reset input of counters 56 and 58. Selected outputs of counter 56 are applied to a pair of three-input OR gates 60 and 62 coupled to a corresponding latch 64 and 66 to generate the EARLY WINDOW and LATE WINDOW signals. An output labelled LOAD PULSE of counter 58 is applied to a latch 68, inverted and applied to a first input of an exclusive-or gate 70 and directly applied to a second input of the exclusive-or gate 70 to generate the LOAD COMPLETE pulse. The LOAD PULSE output of counter 58 is applied to a serializer 72 coupled to a byte decoder and holding register 74. Deserialized encoded data is applied to the byte decoder and holding register 74 that couples byte-wide data to the serializer 72 responsive to a Modulus 8 load pulse output of counter 56.

A modulus 18 counter is used for counter 56 so that during read operations, EARLY and LATE WINDOW pulses are only generated on every other byte intervals. This feature decreases the update rate of the circuit 50 and guarantees stability under all conditions. During non-read operations, no EARLY or LATE WINDOW pulses are generated so that no modulation of the customer read/ref clock will occur and the customer read/ref clock A is guaranteed to be 8/9 of the encoded reference clock.

Referring to FIG. 4, clock modulator 52 includes a counter 76, such as a modulus 9 counter as shown, providing a first counter output applied to an inverted input of an AND gate 78. The LOAD COMPLETE and EARLY WINDOW signals are applied to an AND gate 80. Outputs of AND gates 78 and 80 are applied to an OR gate 82 coupled to a latch 84 to generate a REQUEST TO DROP EXTRA CLOCK signal at the output of latch 84. A second counter output of counter 76 is applied to an inverted input of an AND gate 86 with the LOAD COMPLETE and LATE WINDOW signals applied to an AND gate 88. Similarly, outputs of AND gates 86 and 88 are applied to an OR gate 90 coupled to a latch 92 to generate a REQUEST TO ADD BACK CLOCK signal at the output of latch 84. The first counter output and the REQUEST TO DROP EXTRA CLOCK signal are applied to an AND gate 94. The second counter output and the REQUEST TO ADD BACK CLOCK signal are applied to an AND gate 96. Outputs of AND gates 94 and 96 are applied to an exclusive-OR gate 96 coupled to a latch 100. The 27 MHz clock is allied to a dual input AND gate 102 having the output of latch 100 applied to its second input to produce the customer read/ref clock A.

Referring to FIG. 5, there is shown a chart illustrating clock modulation operation of the adaptable data clock rate circuit 50. As the read process continues, three distinct conditions may occur. When the encoded read clock is slower than the encoded reference clock, the customer read/ref clock will require occasional modulation to run slower in order to remain in the proper byte phasing relationship to the encoded read clock. An example is shown at the top portion of FIG. 5, when the LOAD COMPLETE pulse overlaps the EARLY WINDOW pulse, a REQUEST TO DROP EXTRA CLOCK is generated. The request remains active until such time when the clock pulse is actually dropped. The dropped clock pulse in the customer read/ref clock shifts future LOAD COMPLETE pulses back toward the CENTER WINDOW.

When the encoded read clock is faster than the encoded reference clock, the customer read/ref clock will require occasional modulation to run faster in order to remain in the proper byte phasing relationship to the encoded read clock. An example is shown in the middle portion of FIG. 5, when the LOAD COMPLETE pulse overlaps the LATE WINDOW pulse, a REQUEST TO ADD BACK CLOCK is generated. As shown, the request remains active until such time when the clock pulse is actually added. The added back clock pulse in the customer read/ref clock shifts future LOAD COMPLETE pulses back toward the CENTER WINDOW.

When the LOAD COMPLETE pulse does not overlap either the EARLY WINDOW or the LATE WINDOW, the encoded read and reference clocks are exactly equal as shown at the bottom portion of FIG. 5. Then the customer read/ref clock will remain in the proper byte phasing relationship to the encoded read clock and no modulation of the customer read/ref clock is required.

The clock modulation method of the invention, as applied to an 8/9 rate code, is capable of compensating for up to ±5% frequency differences between the encoded read and reference clock sources.

While the invention has been described with reference to details of the illustrated embodiment, these details are not intended to limit the scope of the invention as defined in the appended claims.

What is claimed and desired to be secured by Letters Patent of the United States is:

1. A data clock modulation method for a disk drive data storage file comprising the steps of:
   generating a data reference clock;
   sensing a readback signal from at least one predetermined region of the disk surface;
   detecting a sync byte responsive to said readback signal;
   generating an early window control signal and a late window control signal corresponding to end boundaries for capturing readback encoded data signals;
   identifying a load complete signal responsive to said readback signal;
   comparing said identified load complete signal with said early window control signal;
   comparing said identified load complete signal with said late window control signal; and
   adjusting said generated data reference clock responsive to overlapping compared signals; said adjusted generated data reference clock having either an increased frequency or a decreased frequency, thereby to conform to a given disk speed.

2. A data clock modulation method for a disk drive data storage file comprising the steps of:
   generating a data reference clock;
   sensing a readback signal from at least one predetermined region of the disk surface;
   detecting a sync byte responsive to said readback signal;
   generating an early window control signal and a late window control signal corresponding to end boundaries for capturing readback encoded data signals;
   identifying a load complete signal responsive to said readback signal;
   comparing said identified load complete signal with said early window control signal;
   comparing said identified load complete signal with said late window control signal; and
   adjusting said generated data reference clock responsive to overlapping compared signals including the step of:
   adding a clock pulse to said generated data reference clock responsive to overlapping load complete signal with said late window control signal.

3. A method as recited in claim 2 wherein said step of adjusting said generated data reference clock responsive to overlapping compared signals includes the step of:
   subtracting a clock pulse from said generated data reference clock responsive to overlapping load complete signal with said early window control signal.

4. A method as recited in claim 2 wherein said step of generating a data reference clock includes the steps of providing an encoded disk rate clock and dropping at least one clock pulse from a predefined number of sequential clock pulses of said encoded disk rate clock to generate said data reference clock.

5. A method as recited in claim 4 wherein a rate 8/9 data code and said encoded disk rate clock is a 27 MHz clock source and one clock pulse is dropped from every nine pulses of said encoded disk rate clock to generate said data reference clock.

6. Apparatus for modulating a data reference clock in a disk drive data storage file comprising:
   means for generating the data reference clock;

means for sensing a readback signal from at least one predetermined region of a disk surface;

means for detecting a sync byte responsive to said readback signal;

means for generating an early window control signal and a late window control signal corresponding to end boundaries for capturing readback encoded data signals;

means for identifying a load complete signal responsive to said readback signal;

means for comparing said identified load complete signal with said early window control signal;

means for comparing said identified load complete signal with said late window control signal; and means for adjusting said generated data reference clock responsive to overlapping compared signals, said adjusting means including means for adding a clock pulse to said generated data reference clock responsive to overlapping load complete signal with said late window control signal.

7. Apparatus as recited in claim 6 wherein said means for generating the data reference clock includes an encoded disk rate clock and means for deriving said data reference clock by dropping at least one clock pulse from a predefined number of sequential clock pulses of said encoded disk rate clock.

8. Apparatus as recited in claim 6 wherein said means for detecting a sync byte responsive to said readback signal sets an initial encoded data byte phase relationship between said means for generating an early window control signal and a late window control signal and said means for adjusting said generated data reference clock.

9. Apparatus as recited in claim 6 wherein said means for generating an early window control signal and a late window control signal include logic and counter means for generating early and late window pulses defining said end boundaries for capturing readback encoded data signals.

10. A disk file comprising:

an enclosure;

a plurality of disk surfaces for storing data and for storing servo identification information on at least one disk surface, said disk surfaces mounted in parallel for simultaneous rotation about an axis within said enclosure;

transducer means mounted for movement in a radial direction across said disk surfaces for reading and writing data to said disk surfaces and for identifying servo identification information;

means for generating a data reference clock;

means for sensing a readback signal from at least one predetermined region of a disk surface;

means for detecting a sync byte responsive to said readback signal;

means for generating an early window control signal and a late window control signal corresponding to end boundaries for capturing readback encoded data signals;

means for identifying a load complete signal responsive to said readback signal;

means for comparing said identified load complete signal with said early window control signal;

means for comparing said identified load complete signal with said late window control signal; and means for adjusting said generated data reference clock responsive to overlapping compared signals, said adjusting means including means for adding a clock pulse to said generated data reference clock responsive to overlapping load complete signal with said late window control signal.

* * * * *